March 25, 1958  L. J. KAMM  2,828,456
SERVOMECHANISM

Filed Nov. 27, 1953  4 Sheets-Sheet 1

March 25, 1958     L. J. KAMM     2,828,456

SERVOMECHANISM

Filed Nov. 27, 1953     4 Sheets-Sheet 2

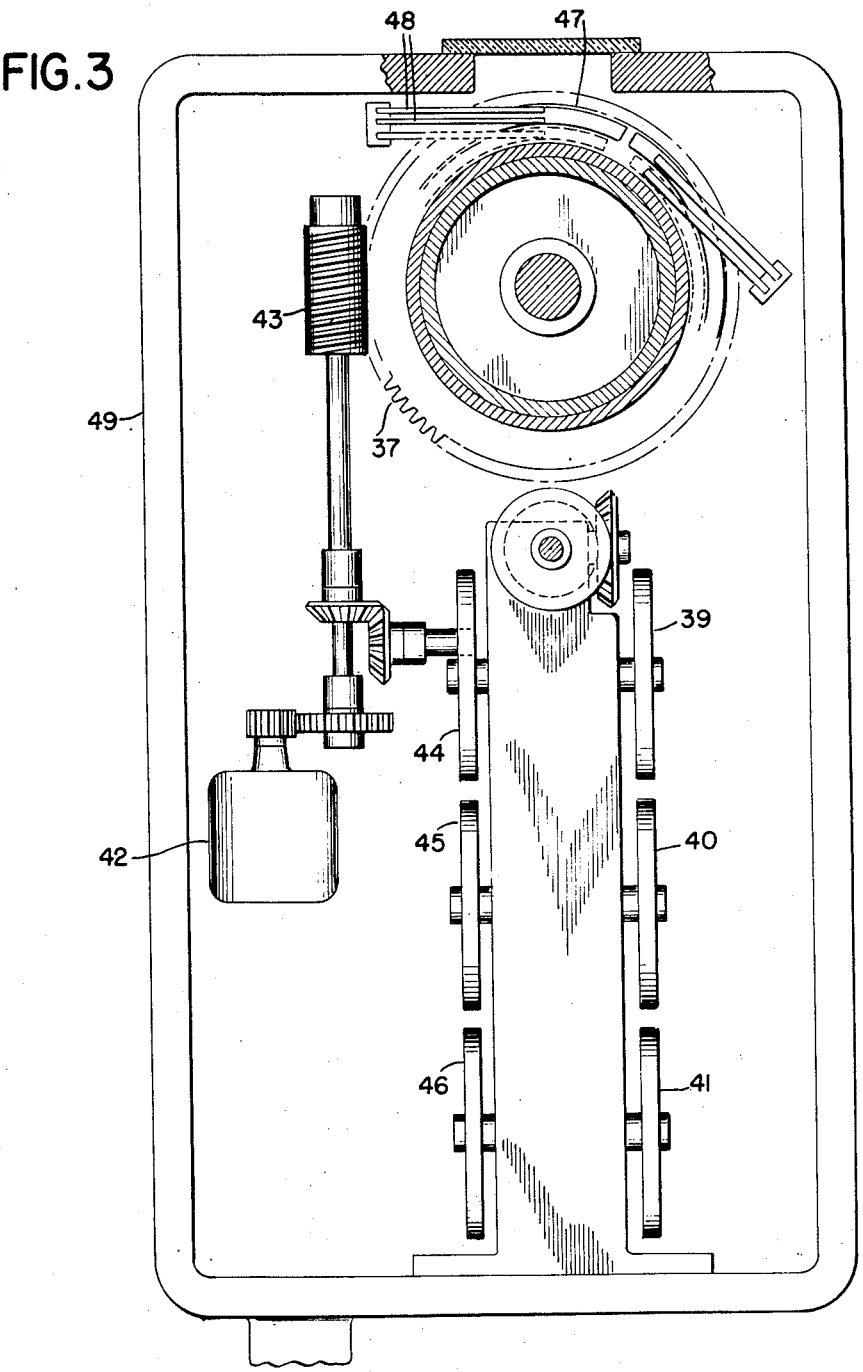

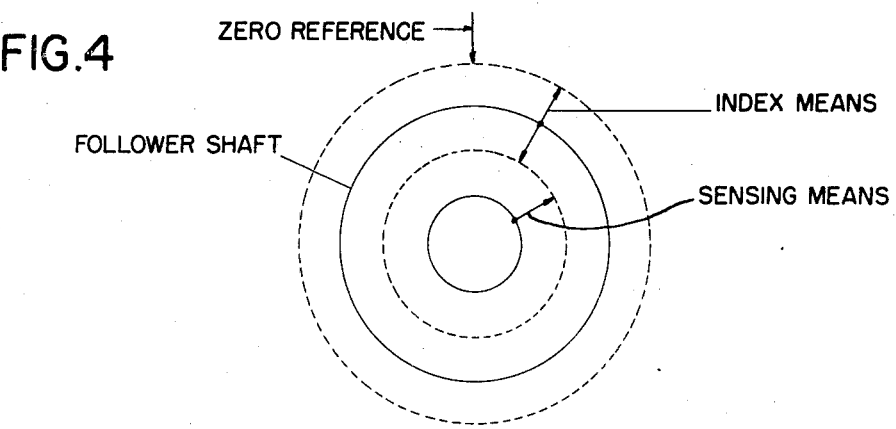
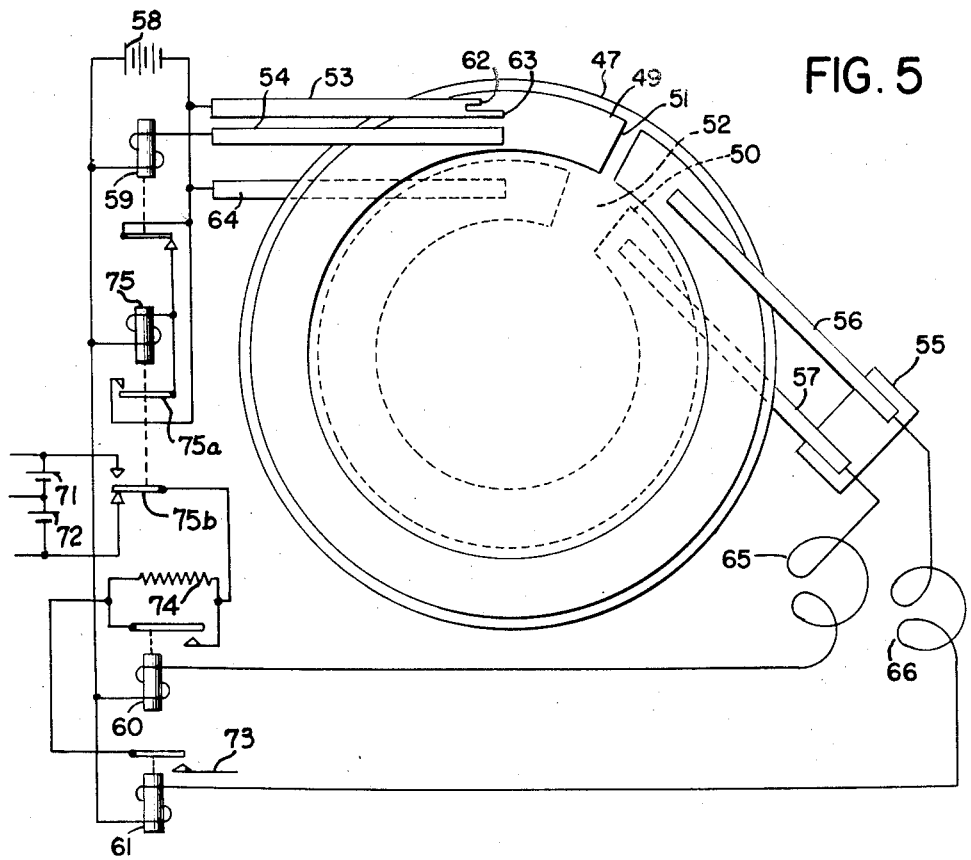

United States Patent Office 2,828,456
Patented Mar. 25, 1958

2,828,456

SERVOMECHANISM

Lawrence J. Kamm, Forest Hills, N. Y., assignor to Sperry Products, Inc., Danbury, Conn., a corporation of New York Application November 27, 1953, Serial No. 394,757

5 Claims. (Cl. 318—28)

This invention relates to servomechanisms, particularly to those in which it is desired to position a member with a high degree of precision.

In my copending application Serial No. 376,509, filed August 25, 1953, now Patent No. 2,792,545, there is described a digital servomechanism in which a member such as a machine lead screw may be positioned from digital data to any degree of precision desired, i. e., to any total displacement and with any minimum increment (or resolution) within the limits of the mechanical accuracy of the parts.

A typical application of the system is in the control of a jig borer or other machine tool table in which a total displacement of twenty inches or more must be controlled in increments of $\frac{1}{10,000}$ inch. In this case the total displacement is 200,000 increments, and the servomechanism must locate the table within the exact increment specified.

The digital servomechanism in the above application will accomplish this if geared to the lead screw driving the table, but it has one limitation. All stages of the position converter are permanently geared together so that for the example described the finest increment commutator or brushes must rotate past 200,000 steps for one full displacement of the machine. In a machine which advances in progressive stages from one end of its displacement to the other with an operation at each stage, this is permissible. In a machine such as a jig borer in which frequent runs of random distances are required, this condition would either require excessive travel time or cause excessive brush speed.

It is an object of this invention to overcome these and other problems by making a servomechanism in which high precision can be achieved with rapid machine motion but without excessive control element speed, motion, or wear.

The invention accordingly comprises an article of manufacture possessing the features, properties, and the relation of elements which will be exemplified in the articles hereinafter described and the scope of the application of which will be indicated in the claims.

For a fuller understanding of the nature and objects of the invention, reference should be had to the following detailed description taken in connection with the accompanying drawings, in which:

Figs. 2 and 3 are drawings of the system as applied to a machine lead screw, Fig. 2 being a side view and Fig. 3 being an end view.

Fig. 4 is a diagram showing the relationships among certain elements of the invention.

Fig. 5 shows an electrical comparator means used in one embodiment of the invention.

Figure 1:
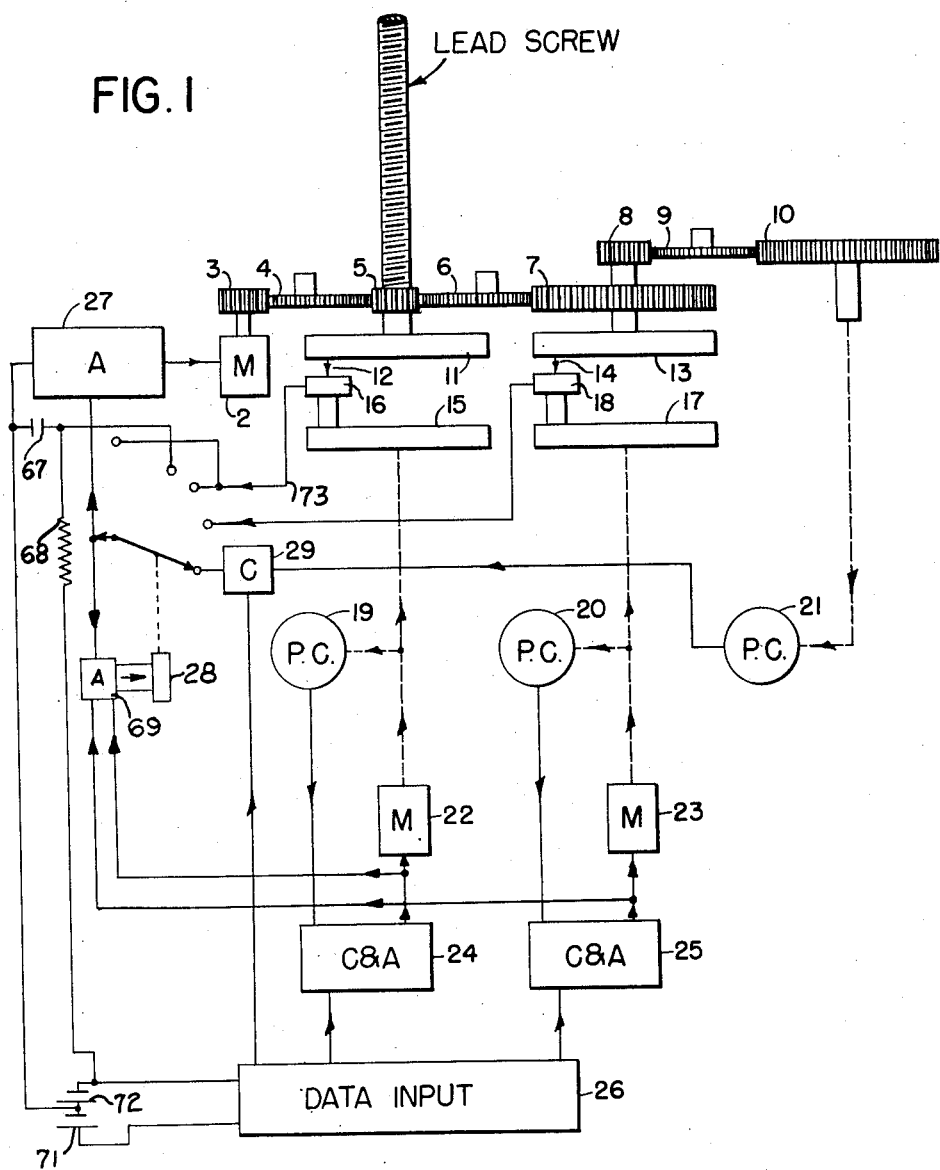
Fig. 1 is a block diagram of the system.

Referring to Fig. 1, lead screw 1 is driven by motor 2 through pinions 3 and 5 and idler 4. The motion is continued through reduction gear train 6, 7, 8, 9, 10. Assume, for example, that the gear ratios are such that one revolution of the lead screw represents 100 increments, one revolution of gear 7 represents 100 revolutions of the lead screw (or 10,000 increments), and one revolution of gear 10 represents 100 revolutions of gear 7 (or 1,000,000 increments). Then the entire gear train has 1,000,000 discrete positions (neglecting backlash, which will be accounted for later).

Connected to pinion 5 and gear 7 are discs 11 and 13 bearing index means 12 and 14 respectively. These index means will be discussed later.

Face to face with discs 11 and 13 and coaxial with them are setting discs 15 and 17 bearing sensing means 16 and 18. Index means 12, 14 and sensing means 16, 18 combine to form comparator means which compare and indicate the relative angular positions of discs 11, 13 and 15, 17. Details of these comparator means will be discussed later.

Coupled to discs 15, 17 and gear 10 are position converters 19, 20, 21, which serve as feedback elements in servo loops. These may be digital coded commutators (or equivalent switching means) as described in the above copending application, or they may be potentiometers or other analog devices.

Motors 22, 23 turn discs 15, 17. The motors are energized by comparator and amplifier units 24, 25. The comparator and amplifier units receive reference data from data input 26 energized by voltage sources 71, 72 and feedback data from position converters 19, 20 and energize motors 22, 23 until both sets of data correspond.

Full scale travel of discs 15, 17 is one revolution.

Motor 2 is energized by amplifier unit 27. Input to this unit is selected by switch 28. It may be the output of position comparators 16 or 18, or data comparator 29.

Figure 2:
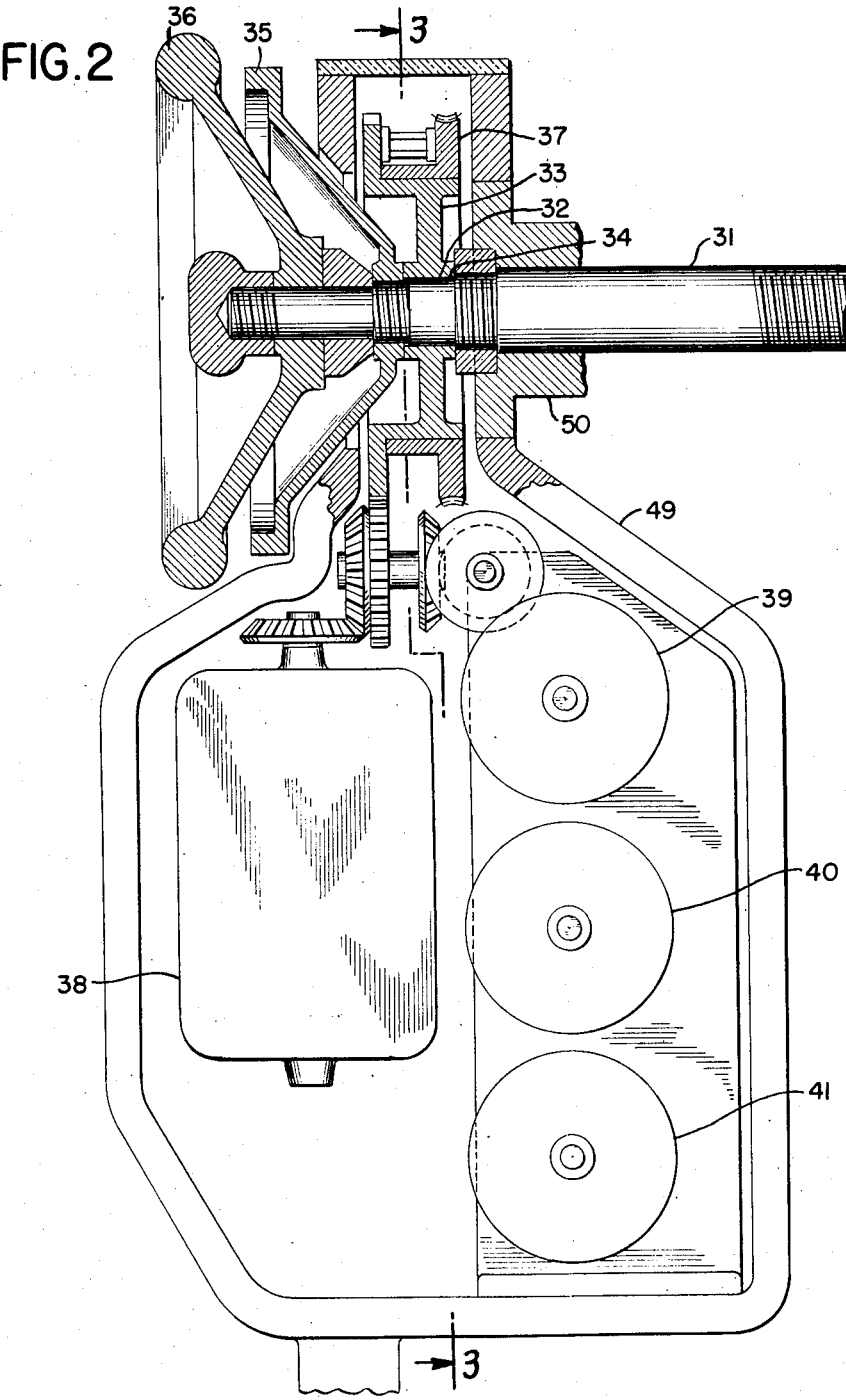

Each of the three servo loops (26—24—22—19, 26—25—23—20 and 26—29—27—2—21) may be of the form illustrated in Fig. 2 of my co-pending application "Digital Servomechanism," Serial No. 376,509.

Operation of the system is as follows: Assume that the output position is indicated by a six digit decimal number of the form ABMNXY. Digits AB are fed from the data input to data comparator 29, digits MN are fed to comparator and amplifier 25, and digits XY are fed to comparator and amplifier 24. Three servos operate simultaneously: Motor 2 turns the output to position AB0000±009000 (approximately), motor 23 turns disc 17 to a position corresponding to MN00±0090, and motor 22 turns disc 15 to a position corresponding to XY±00.9. During this first setting period index means 12, 14 move at relatively high speed many times past sensing means 16, 18, but these sensing means are inoperative during this period.

When all first period settings are complete each of the inputs to summing amplifier 69 is zero and the amplifier de-energizes the coil of switch 28. The switch steps one position and the input to amplifier 27 is transferred to the output of comparator 18 for the second period setting. This causes motor 2 to turn the output until gear 7 and disc 13 turn that fraction of a revolution required to align index means 14 with sensing means 18. The output is now at ABMN00±000090.

When the second period setting is complete the switch is again operated to transfer the input to amplifier 27 to the output of comparator 16 for the third setting period. This proceeds in the same manner as before until the output comes to rest at ABMNXY±.9 (approximately).

The basic operation of the system may be referred to as two stage setting. The first stage consists of setting up reference positions (e. g., positions of discs 15, 17), and the second stage consists of matching the output to the reference positions. Coarse setting of the output may take place during the first stage concurrently with the setting up of fine setting reference positions.

A certain amount of backlash and error will usually be present in the gears. This backlash does no harm but results in a small overtravel of each finer stage during the setting of the next coarser stage. After the coarser stage is set, the motor 2 either advances or reverses to set the finer stage. Thus the final position of the output is approached in a manner similar to a damped oscillation. Because of the backlash the coarser stage gear remains undisturbed during the finer stage setting if the motor is reversed.

In a lead screw operated machine the backlash of the screw is usually larger than the allowable error, so final screw setting should always be in the same direction. This is accomplished by a back-off and reset procedure as follows:

After comparator 16 is satisfied, amplifier 69 again releases switch 28, which steps to its fourth position. This applies the voltage stored in condenser 67 via resistor 68 to the amplifiers. This voltage is derived from one of the same sources (71, 72) which supply the setting servos, and therefore, acts as a synthetic command signal to drive the motor in the negative direction. The voltage leaks off the condenser through the amplifiers in the time it takes for disc 11 to traverse a fraction of a revolution. Amplifier 69 again releases switch 28 which, in its fifth position, reconnects comparator 16. Since the error will always be negative at this stage, comparator 16 will always cause its final setting to be in the positive direction.

The number of digits in each setting group is arbitrary. In the above example each set had two decimal digits. This corresponds to a full scale travel of 100 increments, which is convenient for using potentiometers as position converters since the accuracy of ½ percent required is readily available. (With a pure binary code, seven binary digits would be equally convenient.)

If geared commutators are used for digital readout, then any number of digits per group is possible. Three decimal digits per group are a preferred number since it corresponds to dividing the full scale of a comparator revolution into 1,000 increments of .36 degree each, which is a convenient magnitude for the comparators to sense.

The number of groups depends on the total number of increments in the full travel of the machine and on the number of digits per group. In the example illustrated in Fig. 1 there is one group for direct drive of the output for coarsest setting and two groups for setting up two successively finer degrees of reference position.

In the embodiment illustrated in Fig. 2 there are only two groups, one for coarse setting to three decimal digits and one for fine setting to three decimal digits. This particular embodiment can set a jig borer table or other machine part with a total travel of 100 inches to any .0001 inch increment.

In Figs. 2 and 3 is shown only those mechanical parts of the system mounted on the machine.

Lead screw 31 has neck 32 on which rides driving gear 33. Gear 33 is clamped against screw shoulder 34 by knurled ring nut 35. Hand wheel 36 is on the end of screw 31. The use of the clamped connection between the screw and the driving gear permits zeroing the screw with respect to the machine work before locking it to the electrical control.

Setting gear 37 rides on the hub of driving gear 33.

Driving gear 33 is turned by motor 38 and is geared to a train with three commutators 39, 40, 41 coupled together with 10:1 gears. Each commutator corresponds to one decimal digit. Commutators 39, 40, 41 correspond to position converter 21 in Fig. 1 and are used for coarse setting to the nearest revolution of the lead screw, with a full travel capacity of 1,000 revolutions.

Setting gear 37 is a worm gear turned by motor 42 via worm 43. Worm 43 is geared to a second gear train and set of commutators 44, 45, 46 similar to the first.

Commutators 44, 45, 46 correspond to position converter 20, and motor 42 corresponds to motor 23 in Fig. 1. Setting gear 37 can be set in increments of 1/1000 revolution and is used to set up a reference position for setting the angular position of the lead screw within the revolution selected by the coarse setting.

Commutator 47 and brushes 48 serve as comparator means to control the final positioning of the lead screw.

All parts are mounted in housing 49 attached to the machine frame 50.

Comparator means for indicating relative angle between a reference position setting disc or shaft (15, 17, 37) and an output following disc or shaft (11, 13, 33) may be electrical, electromagnetic, or pneumatic. Theoretically, such means can also be electromechanical, such as a cam operated switch, but it is desirable that mechanical contact be eliminated to prevent wear during the many revolutions of coarse setting.

Before considering comparator construction it is necessary to consider the matching problem more closely. Fig. 4 indicates diagrammatically the relationship among the setting shaft, following shaft, and a fixed reference. The coarse setting leaves the following shaft somewhere within the desired revolution. The setting shaft indicates the desired angular position within the desired revolution. The following shaft can be turned in either direction until it matches the setting shaft. This creates an ambiguity of one revolution. However, if a fixed reference is established at zero angular position, then the following shaft will stay within its specified revolution as long as it does not cross the fixed reference. Therefore a correct matching may be effected by first rotating the following shaft in an arbitrary direction. If it reaches the set position without crossing the zero position, a correct matching will be obtained. If it reaches the zero reference before reaching the set position, its motion is reversed, after which it will approach the set position in the proper direction. If the set position is exactly zero, the follower position will be correct if it reaches both set and zero positions in the negative direction but incorrect if it reaches both positions in the positive direction. In the latter case the direction is reversed.

It is therefore necessary to provide two signals to the control relays, one when the following shaft matches the setting shaft and one when the following shaft matches the zero reference.

It is also desirable to indicate when the following shaft is approaching either the zero or the set position so that it can be run at high speed when it is distant and slowed down to prevent overshoot when it is close.

One embodiment of an electrical comparator means comprises a commutator mounted on the following shaft and brushes mounted on the setting shaft and on a fixed support, as in Fig. 5. Commutator disc 47 is an insulating disc on one face of which is conductive ring 49 and on the other face of which is conductive ring 50. Ring 49 is broken by narrow insulating sector 51 and ring 50 is broken by wide insulating sector 52 symmetrical with sector 51. Sector 51 is the index means corresponding to the following shaft arrows in Fig. 4.

Sector 52 serves to slow the drive motor when the following shaft approaches either the setting shaft position or the zero reference position. Attached to a fixed mounting are brushes 53 and 54 which bear on ring 49. Brush 53 has two contact edges 62, 63 so that one edge is in contact with the ring when the other is on sector 51.

Insulator 55 rotates with the setting shaft, but means for mounting it on the shaft are not shown in the figure. Attached to insulator 55 is brush 56 which bears on ring 49 and brush 57 which bears on ring 50.

Voltage from battery 58 is fed to relays 59 and 61 via brushes 53, 54, and 56 except when insulating segment 51 lies under one or both brushes, in which case the corresponding relay is de-energized. Comparing Fig. 5 with Fig. 4, brush 54 is the zero reference, segment 51 is the following shaft index means, and brush 56 is the setting shaft sensing means. Coincidence of the index means 51 with the zero reference 54 de-energizes relay 59 while coincidence of the index means 51 with the setting shaft sensing means 56 de-energizes relay 61.

Voltage from battery 58 is fed to relay 60 via brush 64, ring 50, and brush 57 except when either brush is on insulating sector 52. This occurs when index means sector 51 approaches either zero reference brush 54 or setting shaft sensing means 56. When relay 60 is de-energized it causes the speed of the following shaft to be reduced to prevent overshoot. It does so by unshorting resistor 74, thus decreasing the current to the amplifier from batteries 71, 72 via wire 73.

Brushes 56 and 57 are connected to the circuit via flexible loops of wire 65, 66 to permit them to turn with the setting shaft. Slip rings and brushes may also be used.

Operation of the circuit of Fig. 5 is as follows: Wire 73 carries current from batteries 71, 72 to the amplifiers 27 and 69. This current is initially from battery 72, which causes motion in the negative direction. If relay 61 is de-energized, it interrupts the circuit to wire 73 and stops the motion. If relay 59 is released first it energizes relay 75 which locks via contacts 75a and transfers wire 73 from battery 72 to battery 71 to reverse the motion to the positive direction.

Since certain changes may be made in the above constructions and different embodiments of the invention could be made without departing from the scope thereof, it is intended that all matter contained in the above description or shown in the accompanying drawings shall be interpreted as illustrative and not in a limiting sense.

I claim:

1. A servomechanism having a final output and comprising a data input having a coarse part and a fine part, said servomechanism having a coarse component servomechanism, a fine component servomechanism, and a matching component servomechanism, said coarse servomechanism being controlled by said coarse part and having a coarse output coupled to said final output, said fine servomechanism being controlled by said fine part and having a fine output, a first rotatable member coupled to said final output, a second rotatable member coupled to said fine output, comparator means mounted on said first and second rotatable members and having an output controlled by the relative positions of said members, said matching servomechanism being controlled by said comparator means output, and means whereby the output of said matching servomechanism modifies said final output to reduce said comparator means output.

2. A servomechanism as in claim 1, in which said comparator means comprises index means rotating about an axis and sensing means rotating about said axis.

3. A servomechanism as in claim 1, in which said comparator means comprises a commutator and brushes.

4. A servomechanism as in claim 3, in which said commutator and brushes are associated with a circuit, said circuit being responsive to direction.

5. A servomechanism as in claim 1, in which said comparator means comprises index means coupled to said final output and rotating about an axis, first index sensing means coupled to said fine output and rotating about said axis, and second index sensing means in a fixed position.

References Cited in the file of this patent

UNITED STATES PATENTS

| | | |
|---|---|---|
| 2,436,172 | Kent | Feb. 17, 1948 |
| 2,455,364 | Hays | Dec. 7, 1948 |
| 2,494,922 | Yardeny | Jan. 17, 1950 |
| 2,560,337 | Fouassin | July 10, 1951 |
| 2,588,213 | Davis et al. | Mar. 4, 1952 |
| 2,630,552 | Johnson | Mar. 3, 1953 |
| 2,645,321 | May et al. | July 14, 1953 |
| 2,662,998 | Witters | Dec. 15, 1953 |